(12) United States Patent
Joseph et al.

(10) Patent No.: US 10,285,243 B2
(45) Date of Patent: *May 7, 2019

(54) SYSTEMS AND METHODS FOR PROVIDING A SELF-ADJUSTING LIGHT SOURCE

(71) Applicant: SIGNIFY NORTH AMERICA CORPORATION, Somerset, NJ (US)

(72) Inventors: Neil Joseph, Sunnyvale, CA (US); Jovi Gacusan, Sunnyvale, CA (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,666

(22) Filed: Apr. 15, 2016

(65) Prior Publication Data

US 2016/0234907 A1    Aug. 11, 2016

Related U.S. Application Data

(63) Continuation-in-part of application No. 14/288,911, filed on May 28, 2014, now Pat. No. 9,345,098.
(Continued)

(51) Int. Cl.
*H05B 33/08* (2006.01)
*H05B 37/02* (2006.01)

(52) U.S. Cl.
CPC ..... *H05B 37/0218* (2013.01); *H05B 33/0827* (2013.01); *H05B 33/0869* (2013.01);
(Continued)

(58) Field of Classification Search
CPC .......... G06F 3/041; G06F 3/0416; G06F 3/14; G06F 3/1446; G09G 5/18; H05B 37/02;
(Continued)

(56) References Cited

U.S. PATENT DOCUMENTS 7,863,829 B2    1/2011  Sayers et al.
8,363,707 B2    1/2013  Hollis
(Continued)

FOREIGN PATENT DOCUMENTS

JP    2005306336 A    11/2005
JP    2011076992 A    4/2011
(Continued)

OTHER PUBLICATIONS

International Search Report & Written Opinion of the International Searching Authority; PCT/US2014/039939; dated Oct. 9, 2014.
(Continued)

*Primary Examiner* — Jimmy T Vu
(74) *Attorney, Agent, or Firm* — Akarsh P. Belagodu

(57) ABSTRACT

System, methods, and apparatus, including devices and software, for providing self-adjusting light sources. In one aspect, a lighting unit includes one or more LEDs and an ambient light sensor. The light sensor measures ambient light in synchronization with intermittent off periods of light generated by the LEDs. For example, the LEDs in the lighting unit can be driven by a pulse width modulated signal that turns on and off the LEDs in an alternating manner, and the ambient light can be measured when the LEDs are turned off. In some implementations, a compact lighting unit, such as a light bulb, is provided that can be easily attached to standard light fixtures and can efficiently control its own brightness based on ambient light conditions.

29 Claims, 7 Drawing Sheets

Related U.S. Application Data

(60) Provisional application No. 61/956,028, filed on May 31, 2013, provisional application No. 61/956,029, filed on May 31, 2013, provisional application No. 61/958,702, filed on Aug. 5, 2013.

(52) U.S. Cl.
CPC ..... H05B 33/0872 (2013.01); H05B 37/0272 (2013.01); *Y02B 20/46* (2013.01)

(58) Field of Classification Search
CPC ............ H05B 33/0842; H05B 33/0845; H05B 33/0854; H05B 33/0896
USPC .... 315/151, 152, 209 R, 224–225, 291, 307, 315/308
See application file for complete search history.

(56) References Cited

U.S. PATENT DOCUMENTS

| | | | | |
|---|---|---|---|---|
| 9,345,098 B2* | 5/2016 | Joseph et al. | ...... | H05B 33/0872 |
| 9,854,647 B2* | 12/2017 | Knaapen | ............ | H05B 33/0869 |
| 2005/0117190 A1 | 6/2005 | Iwauchi et al. | | |
| 2007/0188427 A1* | 8/2007 | Lys | ................... | H05B 33/0815 345/82 |
| 2007/0211013 A1 | 9/2007 | Uehara et al. | | |
| 2010/0277068 A1* | 11/2010 | Broitzman | ............ | F21V 19/045 315/32 |
| 2011/0202151 A1* | 8/2011 | Covaro | ............... | H05B 37/0272 700/90 |
| 2012/0080944 A1 | 4/2012 | Recker et al. | | |
| 2012/0170284 A1* | 7/2012 | Shedletsky | ......... | G02F 1/13318 362/355 |
| 2012/0319585 A1 | 12/2012 | Shteynberg et al. | | |

FOREIGN PATENT DOCUMENTS

| | | |
|---|---|---|
| JP | 2013008658 A | 1/2013 |
| JP | 2013069504 A | 4/2013 |
| JP | 2013084518 A | 5/2013 |
| WO | 2010/068538 A1 | 6/2010 |
| WO | 2013/138613 A1 | 9/2013 |

OTHER PUBLICATIONS

Supplemental European Search Report; EP 14804570; dated Jul. 1, 2016.
Written Opinion of the International Searching Authority and International Search Report; PCT/US2014/039939; dated Oct. 9, 2014.

* cited by examiner

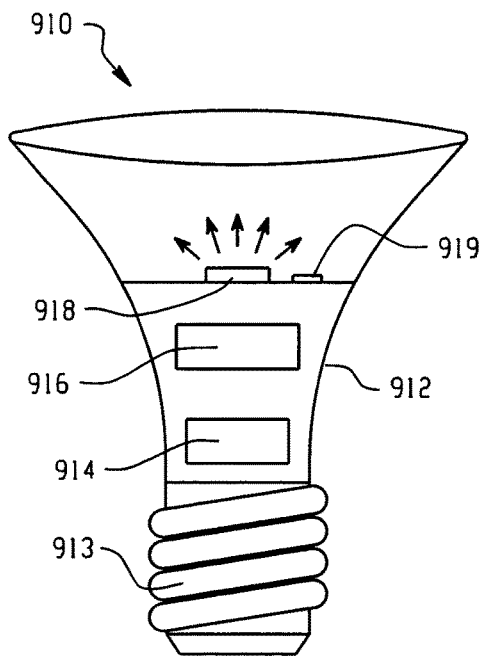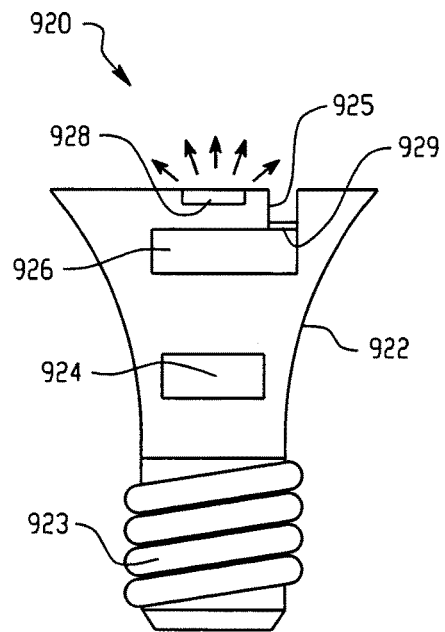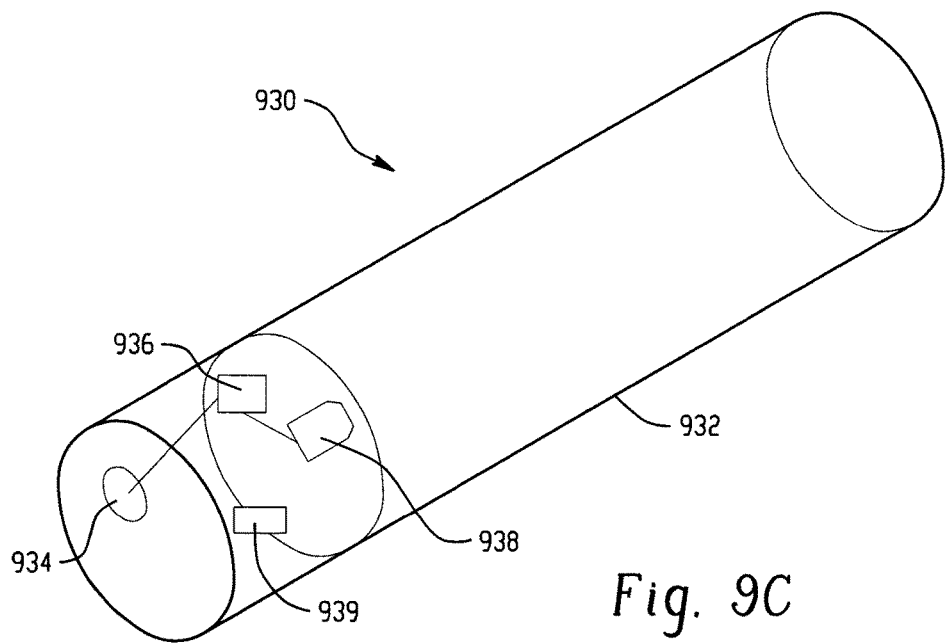

SYSTEMS AND METHODS FOR PROVIDING A SELF-ADJUSTING LIGHT SOURCE

CROSS-REFERENCE TO RELATED APPLICATION AND CLAIM OF PRIORITY

This application is a continuation-in-part of U.S. patent application Ser. No. 14/288,911, filed May 28, 2014, entitled "Systems and Methods for Providing a Self-Adjusting Light Source," which claims the benefit of priority to the following U.S. Provisional patent applications: Ser. No. 61/956,028 filed May 31, 2013, entitled "Method for adjusting light intensity of a lightbulb within the enclosure," the entirety of which is incorporated by reference herein; Ser. No. 61/956,029 filed May 31, 2013, entitled "Light sensor in a light bulb to measure and control the intensity of illumination and motion detection," the entirety of which is incorporated by reference herein; and Ser. No. 61/958,702, filed Aug. 5, 2013, entitled "Method for wireless control of a light bulb." The entirety of all of these applications is incorporated by reference herein.

TECHNICAL FIELD OF THE INVENTION

This disclosure relates to light sources and, in particular, to controlling the light sources based on ambient light measurements.

BACKGROUND

The U.S. Energy Information Administration estimated that, in 2011, electricity used for lighting by the residential and commercial sectors was equal to about 17% of the total electricity consumed by both of these sectors and about 12% of total U.S. electricity consumption. Thus, saving energy consumed by lighting remains an important priority.

One way to save energy consumed by lighting is using light bulbs that are more efficient than the traditional incandescent lamps. For example, compact fluorescent lamps (CFLs) and light emitting diodes (LEDs) offer lighting characteristics comparable to the incandescent lamps, but with less power consumption and longer product lifetime.

SUMMARY

A system, in one aspect, provides a lighting unit that measures ambient light in synchronization with intermittent periods when the light emitted by the unit is temporarily dimmed or turned off. Thus, the lighting unit can control its own overall brightness based on the measured ambient light. For example, the lighting unit can have LEDs driven by a pulse width modulated signal that turns on and off the LEDs in an alternating manner, and the ambient light can be measured when the LEDs are turned off. In another aspect, a system provides a self regulating lighting unit, such as a light bulb, that can be attached to standard light fixtures and controls its own brightness based on ambient light conditions.

In general, in one aspect, a system provides a lighting unit that includes, in part, an LED component having one or more light emitting diodes (LEDs) to emit light from the lighting unit, and an LED driver connected to the LED component to provide current to the one or more light emitting diodes. The lighting unit further includes a light sensor, an LED controller and a measuring component. The light sensor is configured to receive light from a surrounding of the lighting unit and to provide a light intensity signal based on the received light. The LED controller is configured to provide a drive control signal to the LED driver, wherein the drive control signal includes intermittent periods during which the intensity of the light emitted by the LED component is lowered. The measuring component is configured to measure the light intensity signal from the light sensor in synch with the intermittent periods in the drive control signal and to provide the measured light intensity to the LED controller.

BRIEF DESCRIPTION OF THE DRAWINGS

FIGS. 9A, 9B and 9C are schematic diagrams illustrating implementations of compact lighting units according to different embodiments.

DETAILED DESCRIPTION

Figure 1:
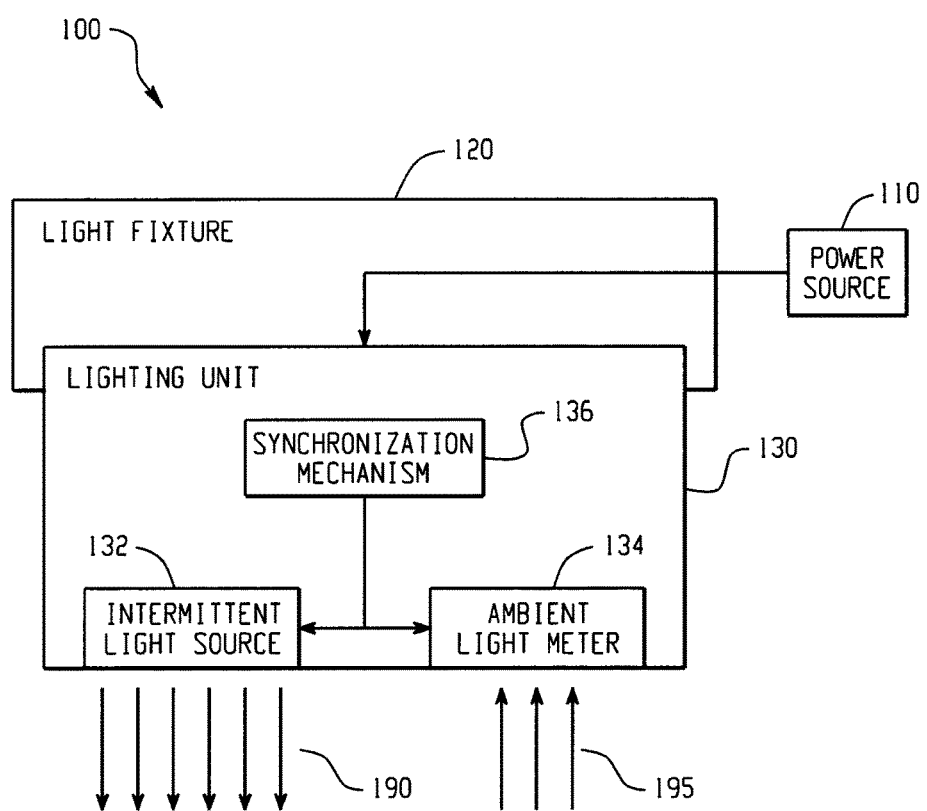
FIG. 1 is a schematic block diagram illustrating a lighting system according to one embodiment of the disclosure.

FIG. 1 is a schematic block diagram that illustrates a lighting system 100 according to one embodiment of the disclosure. The lighting system 100 includes a power source 110, a light fixture 120, and a lighting unit 130. The power source 110 provides electric power to the lighting unit 130 through the light fixture 120 that is configured to receive and hold the lighting unit 130 in place. The lighting unit 130 includes an intermittent light source 132 that uses the received electric power to emit light 190. The lighting unit 130 also includes an ambient light meter 134 and a synchronization mechanism 136 that are used to measure a level of ambient light 195 at the location where the light fixture 120 and the lighting unit 130 are installed. Based on the measured level of the ambient light 195, the lighting unit 130 adjusts the brightness of the emitted light 190. Thus, power consumed from the power source 110 can be saved.

In the lighting unit 130, the light 190 emitted from the intermittent light source 132 is modulated by including relatively short intermittent time periods when the light 190 is turned off or dimmed, and the synchronization mechanism 136 synchronizes the measurement of the ambient light 195 by the ambient light meter 134 with these intermittent time periods of the light source 132. For example, the level of the ambient light 195 can be measured by the light meter 134 during the short time period when the intermittent light source 132 does not emit the light 190. Advantageously, the intermittent time period can be short enough so that the human eye would not directly notice the lack of the emitted light 190 (although the effect of the intermittent period may be sensed by the human eye as a lowered level of average brightness).

In the lighting system 100, the intermittent modulation of the emitted light 190 and the synchronized measurement of the ambient light 195 can be repeated according to a predetermined scheme, for example, periodically or randomly. Thus, the ambient light 195 can be measured in a manner somewhat analogous to an "inverse" stroboscope where the measurements are made during the periods when the emitted light 190 is off (as opposed to a "normal" stroboscope where the observation is typically made during the light-on periods). By using this "stroboscopic" technique, the lighting unit 130 can reliably measure the level of the ambient light 195 and efficiently adjust the brightness of the emitted light 190 based on the measured ambient light 195.

The power for the lighting unit 130 is received from power source 110. The power source 110 can provide AC power, for example, from a standard power outlet. In one implementation, the power source 110 provides a 120V AC power at 60 Hz. Alternatively, the power source 110 can provide 220V AC power at 50 Hz, or any other AC power traditionally used at a particular location. For example, the power source 110 can include a dimming circuit (not shown) that allows users to manually change the voltage or current provided by the power source 110. Thus, the lighting system 100 can be installed anywhere where such a traditional external power is available. Alternatively, the power source 110 can provide DC power, for example, from a battery or a solar panel. Thus, the lighting system can be installed away from standard power outlets. Although the power source 110 is shown separate from the light fixture 120, it can be installed inside the light fixture 120, for example by using a battery or a solar panel so that no external power source is required for the lighting system 100.

The lighting unit 130 is held in place by the light fixture 120. For example, the light fixture 120 can be installed at a permanent location in a building and configured to receive a matching base part of a housing of the lighting unit 130. In one implementation, the light fixture 120 is configured so that the lighting unit 130 can be easily replaced by a user. For example, the light fixture 120 can include a standardized light fixture configured to receive and hold traditional light bulbs and the lighting unit 130 can have a corresponding base, such as a base with a spiral groove ("Edison screw," e.g., E10, E14, or E27) or a twist-lock mechanism ("bayonet"), configured to match the receiving part of those traditional light fixtures. In specific embodiments, the lighting unit 130 can be implemented in a traditional light bulb housing, including general (A series), reflector (R series), bulged reflector (BR series), parabolic aluminized reflector (PAR series), globe (G series), tube or any other traditional designs (such as BA, CA, ER, F, FL, P, PR, PL, PS series). Using a standardized light fixture 120 provides a convenient way to install the lighting system 100 simply by replacing a traditional light bulb with the lighting unit 130 without replacing any wiring in a traditional lighting system. Alternatively, the light fixture 120 can include a non-conventional light fixture especially configured to receive and hold the lighting unit 130. In other implementations, the lighting unit 130 can be held by a portable structure instead of the light fixture 120.

The light fixture 120 is further configured to provide electric connection between the external power source 110 and the lighting unit 130. For example, the light fixture 120 can be configured to provide a two-point electric contact for AC or DC power. The light fixture 120 can also provide additional electric contacts, for example, to control the brightness of the lighting unit 130. In alternative implementations, the light fixture 120 can include other electric components, such as an internal power source, an AC/DC converter, or other power circuits.

The lighting unit 130 provides the emitted light 190 from the intermittent light source 132. The light source 132 can include light emitting diodes (LEDs), organic LED (OLEDs), laser diodes (LDs), or any other light source that can emit intermittent light 190 whose brightness is substantially lowered (e.g., turned off) for short time periods. Advantageously, the interruption of the emitted light 190 can be limited so that the lack of the emitted light 190 is not directly noticed by the human eye. For example, the light 190 can have hundreds or thousands of intermittent periods per second so that the human eye will notice only the average brightness, but not any flicker effect from the individual off periods. In alternative implementations where the human perception has less relevance, the emitted light 190 can be interrupted for longer periods.

The ambient light meter 134 can include a photodiode, a phototransistor, a photoresistor or any other photosensitive element that can provide an electric signal to indicate a level of the ambient light 195. In one embodiment, the ambient light meter 134 uses an infrared sensor, where ambient light is estimated based on data sensed by the infrared sensor. The ambient light meter 134 can include "walls" or "fences" or some optics that limit the "view" of the light meter 134 and prevent the emitted light 190 to directly enter the light meter 134. The emitted light 190, however, can be reflected by objects near the lighting unit 130 and such reflections may enter the light meter 134 and modify the result of the ambient light measurement. As the arrangement of such reflecting objects are often not known before the installation of the lighting system 130, the corresponding reflections cannot be easily accounted for at the design stage and the measurements of the ambient light meter 134 may become unreliable.

To provide a reliable ambient light measurement, the lighting unit 130 includes a synchronization mechanism 136 that synchronizes the ambient light measurements with the intermittent periods of the light source 132. For example, the synchronization mechanism 136 can provide a synch signal (which, based on the "inverse" stroboscopic analogy, could be termed as a "strobe" signal), that causes a temporary turn-off of the light source 132 as well as taking a sample of the ambient light 195 by the light meter 134 during the turn-off period. Alternatively, or in addition, the intermittent light source 132 can have its own, independent turn-off periods (e.g., a duty cycle), and the synchronization mechanism 136 can select some of these turn-off periods to cause the light meter 134 to take sample measurements of the ambient light 195. Thus, the lighting unit 130 can reliably measure the ambient light 195 and adjust the emitted light 190 accordingly.

Figure 2:
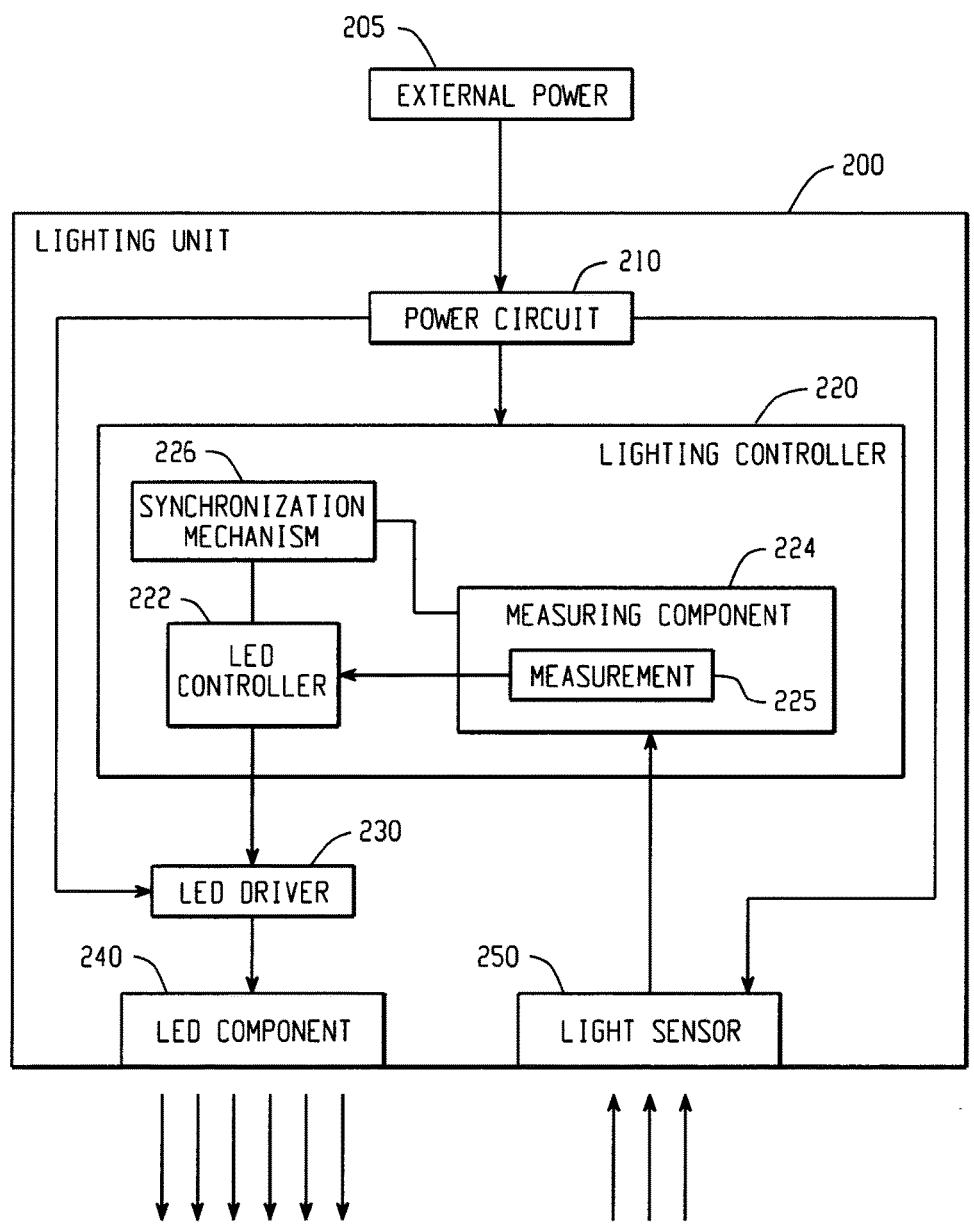
FIG. 2 is a schematic block diagram illustrating a lighting unit according to one embodiment.

FIG. 2 is a schematic block diagram that illustrates a lighting unit 200 according to one embodiment. The lighting unit 200 can be used in lighting systems, such as lighting system 100 shown in FIG. 1, to emit light whose brightness can be adjusted according to the level of ambient light near the lighting unit. For example, the lighting unit 200 can be implemented in a housing of a traditional light bulb and installed in a traditional light fixture in order to save energy without any additional wiring. The lighting unit 200 can also be implemented in non-standard housing for special applications or for portable lighting systems.

The lighting unit 200 includes a power circuit 210, a lighting controller 220, an LED driver 230, an LED component 240, and a light sensor 250. The power circuit 210 receives external power 205, converts that power to a corresponding appropriate format for each of the lighting controller 220, the LED driver 230, and the light sensor 250. The lighting controller 220 receives a light intensity signal from the light sensor 250 and controls the LED driver 230 based on the received light intensity signal. The LED component 240 includes one or more light emitting diodes (LEDs) to emit light and the LED driver 230 provides power from the power circuit 210 to the LED component 240 according to the control from the lighting controller 220.

The power circuit 210 can include one or more power converters, such as rectifiers and switching power circuits, to provide an appropriate power to each element of the lighting unit 200. For example, the power circuit 210 can include diodes and capacitors for the rectifiers, and a high frequency oscillator, a switching controller, and one or more power switches, such as power MOSFETs, for the switching power circuits. The power circuit 210 can be implemented, e.g., on a printed circuit board.

In one implementation, the external power 205 includes a 100-250 Volt AC power at 50-60 Hz, and the power circuit 210 includes a rectifier, such as a bridge rectifier, to rectify the received AC voltage into DC voltage. The power circuit 210 also includes voltage regulators to convert the rectified DC voltage to a driving voltage, e.g., to about 140 Volt DC power that is provided to the LED driver 230, and to a low voltage, e.g., to about 3 Volt DC power that is used to power the lighting controller 220 and the light sensor 250. In alternative implementations, the external power 205 can include a DC power, and the power circuit 210 can convert that DC power to a driving voltage level for the LED driver and one or more low level voltages as required by the lighting controller 220 and the light sensor 250.

The LED driver 230 uses the drive power from the power circuit 210 to drive the LEDs in the LED component 240 to emit light in a controlled manner. For example, the LED driver 230 can set and maintain a specific current that flows through the LEDs in the LED component to emit light at a particular brightness. Alternatively or in addition, the LED driver 230 can intermittently turn on or off the current that flows through the LEDs in the LED component 240, thus producing intermittent light emission. Such an intermittent light emission can extend the life of the LEDs and provide periods when the ambient light can be accurately measured without interference from the light emitted by the LED component.

The light sensor 250 can include one or more photosensors, such as photodiodes, phototransistors, photoresistors or any other photosensitive elements that can provide light intensity signals to indicate a level of the ambient light. Typically, the light sensor 250 has a decay time that characterizes how fast of changes that the light sensor is capable of detecting. Changes that happen faster than the decay time are not directly detected, but only through their averaged value. The decay time can be, for example, in a range of about a hundred microseconds (μs) to about several hundreds of microseconds (μs) depending on the photosensor used in the light sensor 250. For example, the light sensor can have a decay time in a range of about 100 μs to about 500 μs. The decay time may also depend on the environment of the light sensor 250. For example, if the light sensor 250 is near surfaces where the light can be "bounced" around by reflective surfaces, the decay time is increased. In the lighting unit 200, the lighting controller 220 can take into account the decay time of the sensor 250 to improve the ambient light measurement. For example, the lighting controller 220 can provide an intermittent period for the ambient light measurement based on the decay time of the light sensor 250.

The light sensor 250 also can have wideband or a narrowband spectral response. For example, the light sensor 250 can have a photopic response that is designed to approximate the response of the human eye. If the light sensor 250 has a broader or narrower spectral response than the human eye, the lighting controller 220 can apply appropriate corrections to approximate the measured brightness to that as perceived by humans. Alternatively, the lighting controller 220 does not perform any correction for human perception. For example, the lighting unit 200 can have direct user control to set a desired level of brightness and the lighting controller 220 is configured to maintain that brightness level. Also, the lighting unit 200 can be used in applications where the human perception is not critical.

The light sensor 250 can include "walls" or "fences" or some optics that limit the "view" of the light sensor 250. For example, the light sensor 250 can include multiple photosensors each of which is configured to have a different "view." For example, different sensors can receive signals from different directions. Or different sensors can have corresponding optics to collect light from different distances.

The lighting controller 220 includes an LED controller 222, a measuring component 224, and a synchronization mechanism 226. The measuring component 224 receives one or more light intensity signals from the light sensor 250 and generates ambient light measurements 225 based on the received light intensity signals. The measuring component 224 provides the ambient light measurements 225 to the LED controller 222, which generates a drive control signal to control the LED driver 230 based on the ambient light measurements 225. The LED controller 222 is configured to instruct the LED driver 230 to turn off the LED component 240 for intermittent time periods. The synchronization mechanism 226 is configured to synchronize the time when the ambient light measurements 225 are taken with the intermittent time periods of the LED component 240.

In one implementation, the synchronization mechanism 226 generates a measurement synch signal that is used by to the measuring component 224 to time the measurement (sampling) of the light intensity signals from the light sensor 250. (As discussed above, such a measurement synch signal could also be termed as a "strobe" signal based on the "inverse" stroboscopic analogy.) The synchronization mechanism 226 also provides the measurement synch signal to the LED controller 222 to cause a temporary turn-off of the LED component 240 when the measuring component 224 takes a sample of the light intensity signals from the light sensor 250. In one implementation, the synchronization mechanism 226 can be configured to cause a temporary turn-off period of the LED component 240 with a duration that is determined based on the decay time of the light sensor 250. For example, the measuring component 224 can measure the decay of the light sensor 250 and the lighting controller 220 can adjust the temporary turn-off period caused by the synchronization mechanism 226 based on the measured decay.

The synchronization mechanism 226 can generate the measurement synch signal according to a predetermined scheme. For example, the synchronization mechanism 226 can generate a periodic measurement synch signal with a suitably selected period that can range from a fraction of a second to several seconds depending on the specific application where the lighting unit 200 is used. If the lighting unit 200 receives a periodic AC external power 205, the synchronization mechanism 226 can synchronize the periodic measurement synch signal with the periodic AC external power 205. Alternatively or in addition, the synchronization mechanism 226 can generate a random measurement synch signal. Such a random measurement can be used in an environment where other light sources might have periodic fluctuations which may distort the ambient light measurement.

Alternatively or in addition to turning off the LED component 240 according to the measurement synch signal, the LED controller 222 can have its own, independent turn-off periods, and the synchronization mechanism 226 can select some of these turn-off periods to cause the measuring component 224 to take sample measurements 225 of the light intensity signals from the light sensor 250. Thus, the lighting unit 200 can reliably measure the ambient light and adjust the light emitted by the LED component 240 accordingly.

Figure 3:
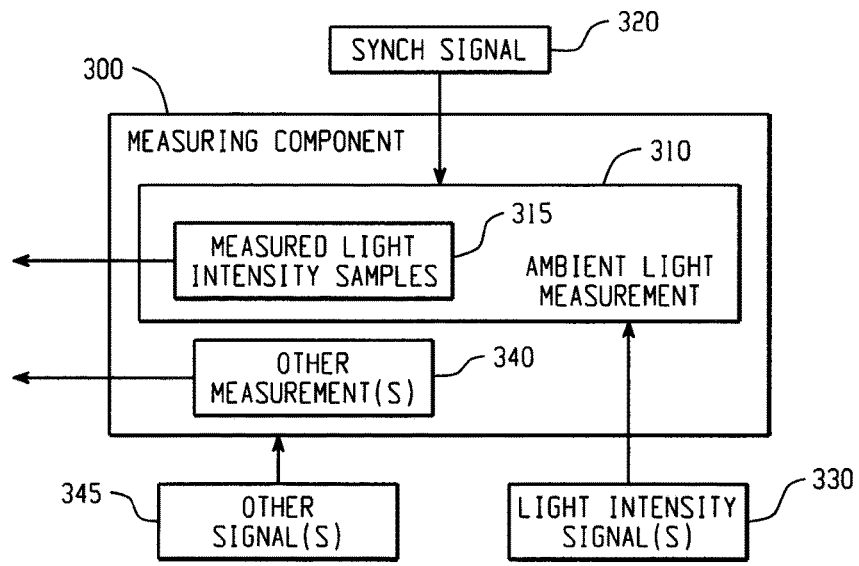
FIG. 3 is a schematic block diagram illustrating a measuring component for a lighting unit according to one embodiment.

FIG. 3 is a schematic block diagram illustrating a measuring component 300 for a lighting unit according to one embodiment. The measuring component 300 can be implemented, for example, in the lighting controller 220 of the lighting unit 200 shown in FIG. 2. In alternative implementations, the measuring unit 300 can be implemented separate from lighting units, for example, in a light fixture.

The measuring component 300 includes an ambient light measurement element 310 that provides measured light intensity samples 315 based on light intensity signals 330 and a measurement synch (strobe) signal 320. The measuring component 300 also includes element 340 for other measurements based on other signals, e.g., from occupancy or chemical detectors. The measured light intensity samples 315 can provide ambient light measurements for an LED controller, such as LED controller 222 shown in FIG. 2, to adjust brightness of emitted light. The element 340 for other measurements can also provide measurement samples to the LED controller and used to adjust the emitted light.

The ambient light measurement element 310 can receive the measurement synch signal 320 from a synchronization mechanism such as synchronization mechanism 226 shown in FIG. 2. The ambient light measurement element 310 can be configured to recognize a predetermined event in the synch signal 320 and take a sample 315 of the light intensity signal 330 in response to such predetermined event. For example, the ambient light measurement element 310 can be configured to recognize a falling or rising edge of the synch signal 320 and take a sample 315 of the light intensity signal 330 in response to the detection of such an edge. Or, the ambient light measurement element 310 can be configured to recognize a predetermined voltage level of the synch signal 320 and take a sample 315 of the light intensity signal 330 in response to the detection of such a predetermined level. The ambient light measurement element 310 can take the sample 315 of the light intensity signal 330 without any further delay or with a predetermined delay after the event in the synch signal 320 is detected. In one implementation, the delay to take the sample is determined based on the decay characteristics of the light sensor from which the light intensity signal 330 is received.

The ambient light measurement element 310 can provide the measured light intensity samples 315 to another component, such as an LED controller, in order to adjust the light emitted by a lighting unit. The measured light intensity signals 315 can be provided with additional information related to the measurement. For example, the additional information can indicate a spectral response of the light sensor which provided the light intensity signal 330. Or, the ambient light measurement element 310 can take the samples 315 in response to different type of events (such as both at the rising and falling edges) in the synch signal 320 and provide the associated type of event along with the particular sample. Or the ambient light measurement element 310 can take the samples with different delays from a specific event in the synch signal 320, and provide the associated delay along with those samples. The ambient light measurement element 310 can also determine a decay in the samples 315 measured with different delays, and provide the calculated decay along with the samples 315. Alternatively or in addition, the calculated decay can be used to adjust the synch signal 320 to provide sufficient time for clearing any transient effects before taking the samples.

The element 340 for other measurements can receive other intensity signals 345 from additional sensors, such as occupancy, chemical, temperature, or humidity sensors. For example, a signal 345 from a motion or infrared sensor can provide measurement information 340 about occupancy near that sensor. Or a signal 345 can be received from a carbon monoxide (CO) or carbon dioxide (CO2) sensor to provide measurement information 340 about the safety of the environment near that sensor.

Figure 4:
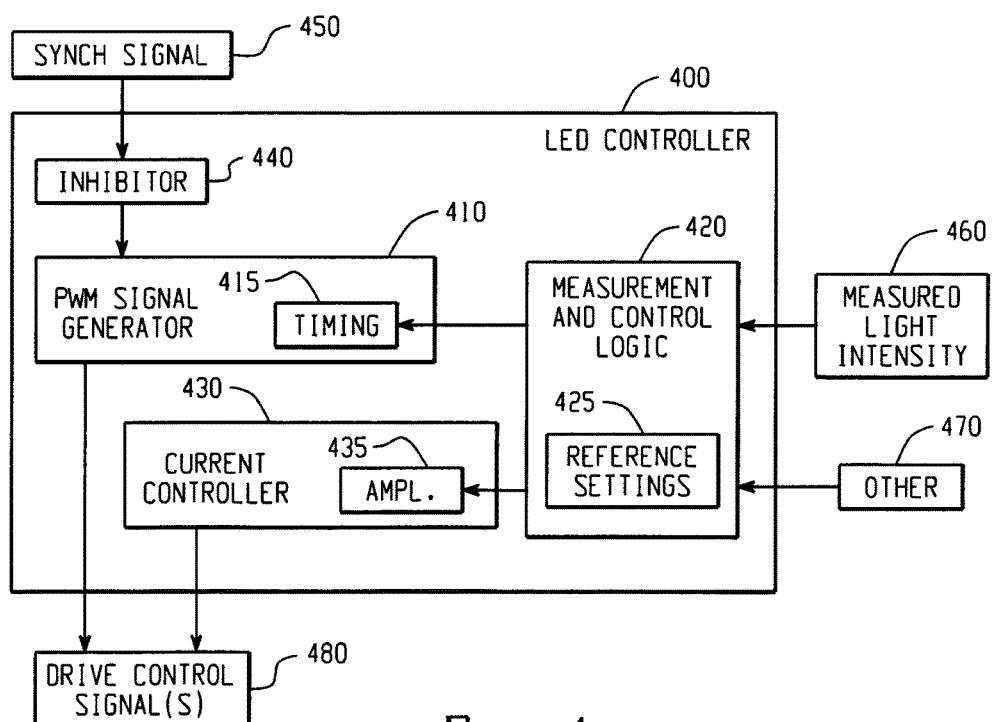
FIG. 4 is a schematic block diagram illustrating an LED controller for a lighting unit according to one embodiment.

FIG. 4 is a schematic block diagram illustrating an LED controller 400 for a lighting unit that includes LEDs to generate light according to one embodiment. For example, the LED controller 400 can be implemented in the lighting controller 220 of the lighting unit 200 to control the LED driver 230 shown in FIG. 2. In alternative implementations, the LED controller 400 can be implemented separate from lighting units, for example, in a light fixture.

The LED controller 400 includes a pulse width modulation (PWM) signal generator 410, a measurement and control logic 420, a current controller 430 and an inhibitor 440. The measurement and control logic 420 receives measured light intensity samples 460 and, optionally, other samples 470, and uses those samples to generate one or more timing parameters 415 for the PWM signal generator 410 and one or more amplitude parameters 435 for the current controller 430. Based on the timing and amplitude parameters 415 and 435, the PWM signal generator 410 and the current controller 430 generate drive control signals 480 for an LED driver. The inhibitor 440 in the LED controller 400 receives a synch signal 450 and uses the received synch signal 450 to instruct the PWM signal generator 410 to generate drive control signals 480 that inhibit light emission for intermittent time periods. Such intermittent periods of no emitted light can be used to measure ambient light levels more accurately.

The PWM signal generator 410 can generate an alternating drive control signal 480 to turn on and off the LEDs based on the timing parameters 415. In one implementation, the PWM signal generator 410 generates a periodic square signal and the timing parameters 415 determine the periodic signal's frequency and a corresponding duty ratio. The duty ratio is the ratio of the durations of the on and off periods within the periodic signal. Thus, the timing parameters 415 determine the duty ratio of the PWM drive control signal 480 which, in turn, determines the overall or average brightness of the driven LEDs. In particular embodiments, the periodic PWM drive control signal 480 can have a frequency of a few hundred Hz (i.e., number of periods per second) or few hundred kHz. For example, the frequency of the PWM drive control signal 480 can be between about 100 Hz and about 100 kHz. In alternative implementations, the PWM signal generator 410 can generate a non-periodic drive control signal 480, such as a pseudo random alternating signal with a desired average frequency and average duty ratio.

The PWM signal generator 410 also receives a signal from inhibitor 440. The inhibitor 440 is configured to inhibit the PWM drive control signal 480 by putting it into an off position for a time period as determined by the synch signal 450. In one implementation, the inhibitor 440 is configured to recognize a predetermined event in the synch signal 450 and to inhibit the PWM drive control signal 480 in response to such a predetermined event. For example, the inhibitor 440 can be configured to recognize rising and falling edges of the synch signal 450 and inhibit the PWM drive control signal 480 between a rising and a subsequent falling edge of the synch signal. Or, the inhibitor 440 can be configured to detect a voltage level of the synch signal 450 and inhibit the PWM drive control signal 480 while the detected voltage is above such a predetermined level. The inhibitor 440 can also inhibit the PWM drive control signal 480 for a predetermined time period after detecting a corresponding event (e.g., a rising edge) in the synch signal 450. The predetermined period of the inhibition can be selected based on the time, e.g., a typical light sensor decay time required for an ambient light measurement. Thus, during the off period, the LEDs do not emit light and the ambient light can be more accurately measured.

In addition to the PWM signal from generator 410, the drive control signals 480 can include a current control signal that is generated by the current controller 430 based on the amplitude parameter 435. The current control signal from the current controller 430 is configured to determine the current which passes through the LEDs and thus can be used to control the brightness of the LEDs. In one implementation, the PWM signal is used to turn on and off the LEDs and the current control signal is used to control the current that passes through the LEDs when they or turned on. Thus, the brightness of the light emitted by the LEDs can be easily controlled as required by a particular application, such as dimming the emitted light according to an ambient light level or as instructed by a user input.

The measurement and control logic 420 receives the measured light intensity samples 460 that can indicate the level of ambient light and, based on the received samples 460 and reference settings 425, determines the timing parameters 415 for the PWM signal generator 410. Optionally, the measurement and control logic 420 can also determine the amplitude parameters 435 for the current controller 430. The measurement and control logic 420 can implement a functional relationship between the ambient light intensity samples 460 and the timing parameters 415 as required for specific implementations.

In one implementation, the measurement and control logic 420 determines representative values, e.g., averages, of the received light intensity samples 460 and uses those representative values to adjust the duty ratio of the PWM drive control signal 480 through the timing parameters 415. For example, the measurement and control logic 420 can calculate a representative value based on a moving average over a predetermined number (e.g., 5-10 samples) of the latest light intensity samples 460. Instead of or in addition to the moving average, the measurement and control logic 420 can use other filters, such as median filters, to determine the representative values of the light intensity samples. Then, the measurement and control logic 420 compares the representative values of the samples 460 to corresponding reference settings 425 to determine the timing parameters 415 so that a desired illumination is provided by the controlled LEDs.

In particular embodiments, the measurement and control logic 420 is configured to set the timing parameters 415 so that the controlled LEDs are turned off if the representative values of the light intensity samples 460 are above a reference level determined by the reference settings 425, thus indicating that the ambient light provides sufficient illumination. On the other hand, if the representative values of the ambient light intensity samples 460 are below the reference level determined by the reference settings 425, the timing parameters 415 are set to provide an increased duty ratio (i.e., more "on" time). Thus, the controlled LEDs emit more light when the ambient light is low. The measurement and control logic 420 can implement an inverse relationship between the measured ambient light intensity and the duty ratio (consequently the brightness) of the LEDs controlled by the LED controller 400. This inverse relationship can be linear or it can have some other monotonic functional form. Alternatively or in addition to the timing parameters 415, the measurement and control logic 420 can be configured to set the amplitude parameters 435 to achieve the desired illumination.

The reference settings 425 in the measurement and control logic 420 represent parameters, such as one or more reference ambient light levels, that can be used to define the functional relationship between the measured light intensity samples 460 and the corresponding timing and amplitude parameters 415 and 435 for the drive control signals 480. The reference setting 425 can have preset values or values set by the user. For example, the LED controller 400 can receive user settings from a manual control in a lighting switch through a wired or wireless connection. The LED controller can also receive settings from control devices, such as computers running a software application to control lighting levels. Or the LED controller 400 can be implemented in a lighting unit that includes manually actuated switches or buttons to receive user input setting a desired light level.

In one implementation, the measurement and control logic 420 receives additional information related to the light intensity samples 460. For example, the additional information can include relative delays between a set of subsequently measured light intensity samples 460. Or, the additional information can characterize spectral (bandwidth) or dynamic (decay) properties of the light sensor that was used to measure the intensity of the ambient light. Thus, the measurement and control logic 420 can be configured to adjust the drive control signals 480 using this additional information. For example, the light intensity samples 460 can be processed to correct the undesirable effects of narrow band or slow light sensors. In one implementation, the measurement and control logic 420 is configured to calculate the decay of the light sensor from subsequent samples 460 measured during the same intermittent off period with different delays.

The measurement and control logic 420 can also receive other measurement samples 470, for example, from an occupancy detector or a chemical detector, and use these samples 470 to adjust the timing and amplitude parameters 415 and 435 to alter the light emitted by the controlled LEDs. For example, the measurement and control logic 420 can turn off the controlled LEDs if the samples 470 include measurements from the occupancy detector indicating that nobody is around. Or the measurement and control logic 420 can visibly and periodically alter the brightness or color of the controlled LEDs to provide a warning if the samples 470 include measurements from the chemical detectors indicating that dangerous chemicals are around and thus the environment is not safe.

Figure 5:
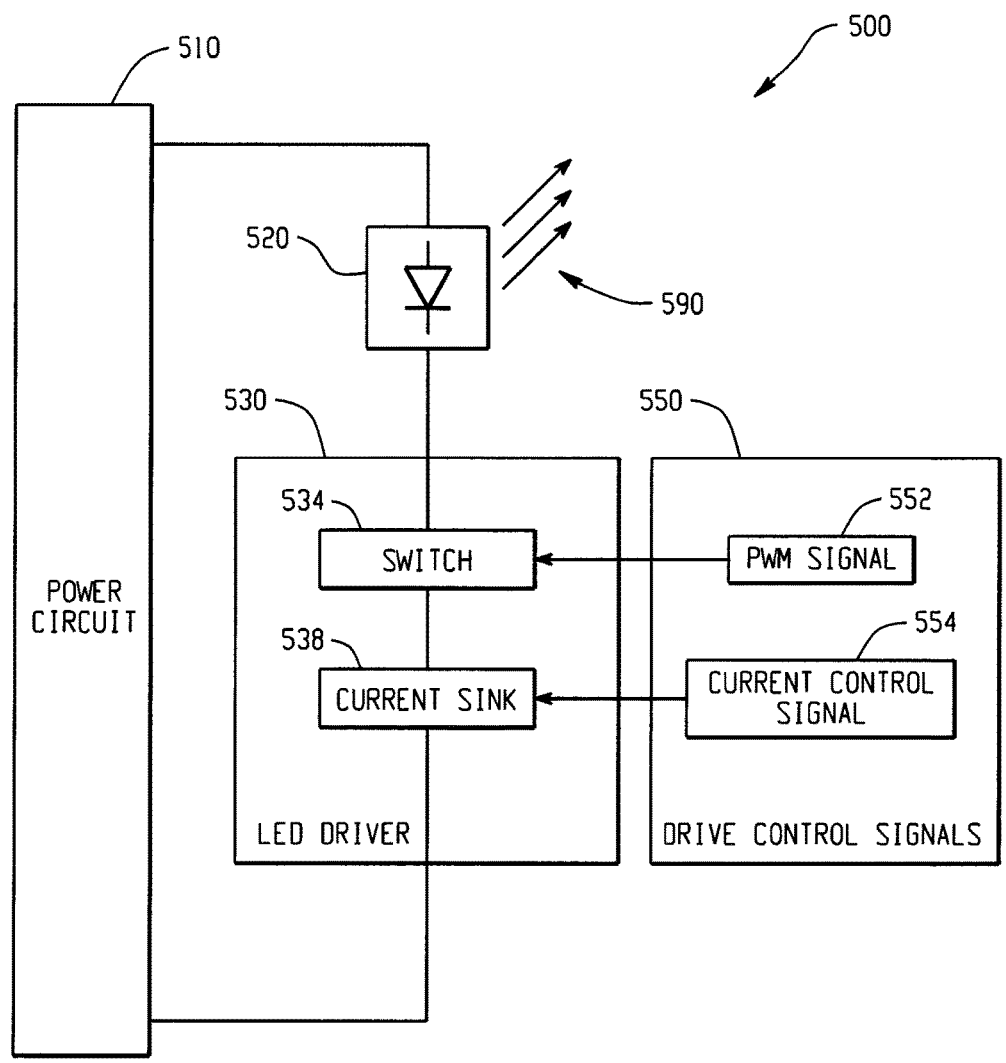
FIG. 5 is a schematic block diagram illustrating a system for intermittent driving of LEDs in a lighting unit according to one embodiment.

FIG. 5 is a schematic block diagram illustrating a system 500 for intermittent driving of LEDs in a lighting unit according to one embodiment. The system 500 can be implemented, for example, in the lighting unit 200 shown in FIG. 2. In alternative implementations, the system 500 can be implemented in a combination of a lighting unit and a light fixture.

The system 500 includes a power circuit 510 that powers an LED component 520 through an LED driver 530 to emit light 590. In the system 500, the LED driver 530 receives drive control signals 550 that control the current through the LED component 520, and thus the brightness of the emitted light 590. In particular, the LED component, the LED driver 530, and the drive control signals 550 are configured to generate intermittent periods when the brightness of the emitted light 590 is lowered, e.g., turned off, for a short time. Such intermittent driving system 500 can provide for accurate ambient light measurements during the off periods. As the driving current is not flowing continuously, the intermittent driving system 500 can also extend the life of the LEDs in the LED component 520.

In the LED driving system 500, the LED component 520 and the LED driver 530 are coupled in series with the power circuit 510. The power circuit 510 provides DC power to the LED component 520 such that a DC current flows through the LED component 520 and the LED driver 530 back to the power circuit 510. For example, the power circuit 510 can convert standard AC power, e.g., a 120 V AC power at 60 Hz, from a wall outlet to provide a DC power in the range of about 100 V to about 200 V. Or the power circuit 510 can provide the DC power from a portable power source, such as a battery or a solar panel.

The LED component 520 includes one more LEDs that emit the light 590 as the DC current is flowing through those LEDs. The LEDs in the component 520 can include semiconductor structures, such as GaN or GaAs based LEDs, or organic light emitting diodes (OLEDs). In particular implementations, the LED component 520 can provide white light or any colored light as required for a specific implementation. For example, the LED component 520 can include LEDs of different colors that can be combined to emit light with a specific color temperature. Thus, the LED component 520 can provide color temperature shifting.

The LED driver 530 includes a switch 534 coupled in series with the LED component 520. In one embodiment, the switch 534 includes a power MOSFET which can efficiently turn on and off the DC power current. In alternative implementations, the switch 534 can include any other power switch such as diodes, JFETs, IGBT, BJT, thyristors. Although the switch 534 has been illustrated at a specific part of the driving system 500, it can be located elsewhere, for example in the power circuit 510 and perform the same function of turning off the LED component 520. For example, the switch may be connected to the primary winding of a transformer, while the LED is connected to the secondary winding of the transformer.

The switch 534 is turned on or off according to a pulse width modulated (PWM) drive control signal 552. Thus, the DC current from the power circuit 510 may flow through the LED component 520 when the switch 534 is turned on by the PWM signal 552, but no (or minimal) current can flow through the LED component 520 when the switch 534 is turned off by the PWM signal. The PWM drive control signal 552 can turn on and off the LED component 520 at a high frequency (e.g., 1-100 kHz so that the individual intermittent off periods of the emitted light 590 are not directly observed by the human eye. Instead, the human eye perceives only an average brightness that is proportional to the duty ratio of the PWM drive control signal.

The LED Driver 530 in the LED driving system 500 also includes a current sink 538 coupled in series with the switch 534 and the LED component 520. The current sink 538 is configured to control the amount of current that flows through the LED component 520 back to the power circuit 510. In particular, the current sink 538 receives a current control drive signal 554 that determines the amount of DC current that can flow back to the power circuit 510. As the brightness of the LEDs in the LED component 520 depends on the amount of the DC current, the current control drive signal 554 can also be used for controlling the brightness of the emitted light 590. Alternatively or in addition, a current source or other current limiting circuit can be used to control the amount of DC current that flows through the LED component 520.

Figure 6:
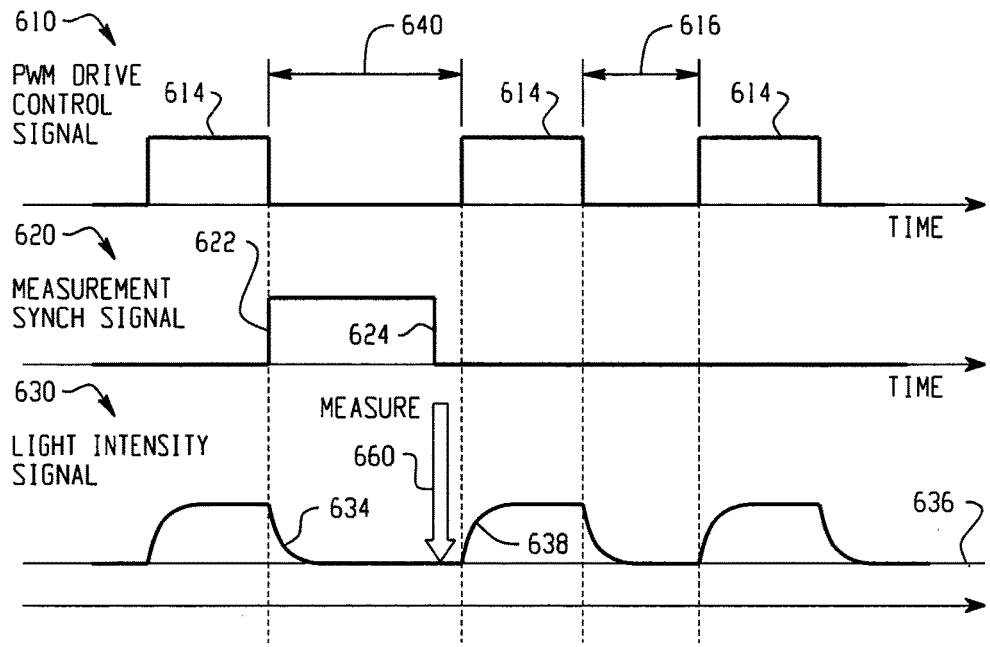
FIGS. 6 and 7 are schematic diagrams illustrating signals in a lighting unit according to different embodiments.

FIG. 6 includes schematic diagrams illustrating traces of a pulse width modulated (PWM) drive control signal 610, a measurement synch signal 620 and a light intensity signal 630 as a function of time according to one embodiment. The PWM drive control signal 610 and the measurement synch signal 620 can be generated by a lighting controller, and the light intensity signal 630 can be generated by a light sensor in a lighting unit, such as the lighting controller 220 and the light sensor 250 in the lighting unit 200 shown in FIG. 2. For example, the PWM drive control signal 610 can be generated by the LED controller 222 to control the LED driver 230 and the measurement synch signal 620 can be generated by the synchronization mechanism 226.

The signals 610, 620 and 630 illustrate an implementation of using the measurement synch signal 620 to synchronize the PWM drive control signal 610 with an ambient light measurement (sampling) 660 of the light intensity signal 630. The PWM drive control signal 610 includes regular turn-on and turn-off periods 614 and 616 to turn on and off the driven LEDs according to a specific duty ration and thus intermittently emit light with a corresponding average brightness. The PWM drive control signal 610 also includes a measurement turn-off period 640 to turn off the driven LEDs so that no light is emitted when the ambient light measurement 660 happens.

The trace of the light intensity signal 630 illustrates how the signal from the light sensor changes as a result of turning on and off the emitted light by the PWM drive control signal 610. For example, as the light is turned off at the beginning of the turn-off period 640, the light intensity signal 630 shows a gradual decay 634 to an ambient light level 636. As the light is turned on at the end of the turn-off period 640, the light intensity signal 630 shows a gradual increase to a higher light intensity, indicating that the light emitted by the driven LEDs is detected by the light sensor in addition to the ambient light. The light intensity signal 630 shows similar gradual decrease and increase characteristics at the next turn-off period 616 when the light is turned off and on.

The measurement turn-off period 640 is triggered by a rising edge 622 of the measurement synch signal 620. The rising edge 622 inhibits the PWM drive control signal 610 for a predetermined duration that corresponds to the duration of the turn-off period 640. The following falling edge 624 of the measurement synch signal 620 triggers the measurement (sampling) 660 of the light intensity signal 630. The time delay between the rising and falling edges 622 and 624 of the synch signal 620 is shorter than the predetermined duration of the measurement turn-off period 640 in the LED drive signal 610. Thus, the measurement 660 triggered by the falling edge of the synch signal is taken when the light is still turned off. Furthermore, the time delay between the rising and falling edges 622 and 624 of the synch signal 620 is longer than the decay time of the light intensity signal 630. Accordingly, the measurement 660 can accurately represent the ambient light level 636.

Figure 7:
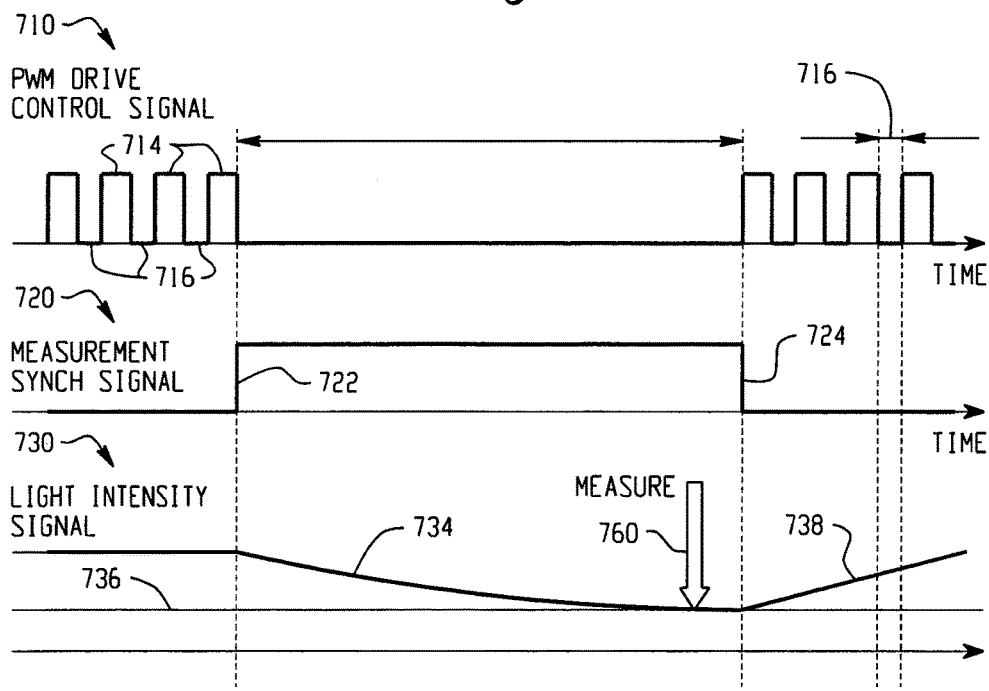

FIG. 7 includes schematic diagrams illustrating traces of a pulse width modulated (PWM) drive control signal 710, a measurement synch signal 720 and a light intensity signal 730 as a function of time according to another embodiment. The PWM drive control signal 710 and the measurement synch signal 720 can be generated by a lighting controller, and the light intensity signal 730 can be generated by a light sensor in a lighting unit, such as the lighting controller 220 and the light sensor 250 in the lighting unit 200 shown in FIG. 2. For example, the PWM drive control signal 710 can be generated by the LED controller 222 to control the LED driver 230 and the measurement synch signal 720 can be generated by the synchronization mechanism 226.

The signals 710, 720 and 730 illustrate an implementation of using the measurement synch signal 720 to synchronize an ambient light measurement 760 of the light intensity signal 730 with the PWM drive control signal 710. The PWM drive control signal 710 includes turn-on and turn off periods 714 and 716 to turn on and off the driven LEDs according to a specific duty ratio and thus intermittently emit light with a corresponding average brightness. The PWM drive control signal 710 also includes a measurement turn-off period 740 to turn off the LED component so that no light is emitted when the ambient light measurement 760 happens.

The trace of the light intensity signal 730 illustrates how the signal from the light sensor changes as a result of turning on and off the emitted light. In the example of FIG. 7, as the light is turned on and off before the turn-off period 740, the light intensity signal 730 has a substantially constant value indicating that the light sensor is relatively slow and measures only the average illumination level. At the beginning of the measurement turn-off period 740, the light intensity signal 730 shows a slow, gradual decay 734 to an ambient light level 736. As the light is turned on at the end of the turn-off period 740, the light intensity signal 730 shows a gradual increase to a higher light intensity, indicating that the light emitted by the LED component is detected by the light sensor in addition to the ambient light. The light intensity signal 730, unlike the light intensity signal 630 in the example of FIG. 6, can not detect the individual turn-off periods 716 because their duration is shorter than the characteristic decay time of the light sensor producing the light intensity signal 730.

The measurement turn-off period 740 is triggered by a rising edge 722 of the measurement synch signal 620. The rising edge 722 inhibits the PWM drive control signal 710 until the subsequent falling edge 724 of the synch signal 720. The rising edge 722 of the measurement synch signal 720 also triggers the measurement (sampling) 760 of the light intensity signal 730 after a predetermined delay. The time delay between the rising edge 722 and the measurement 760 is configured to be shorter than the time between the rising and falling edges 722 and 724 of the synch signal 720 which inhibits the LED drive signal 710 during the turn-off period 740. Thus, the measurement 760 triggered by the rising edge 722 of the synch signal 720 is taken when the light is still turned off. Furthermore, the time delay between the rising edge 722 and the measurement 760 is longer than the decay time of the light intensity signal 730. Accordingly, the measurement 760 can accurately represent the ambient light level 736.

In alternative implementations, the measurement 760 can be taken before the light intensity signal 730 fully settles to the ambient light value 736, and the measured value can be corrected based on the decay 734 of the light intensity signal 734.

Figure 8:
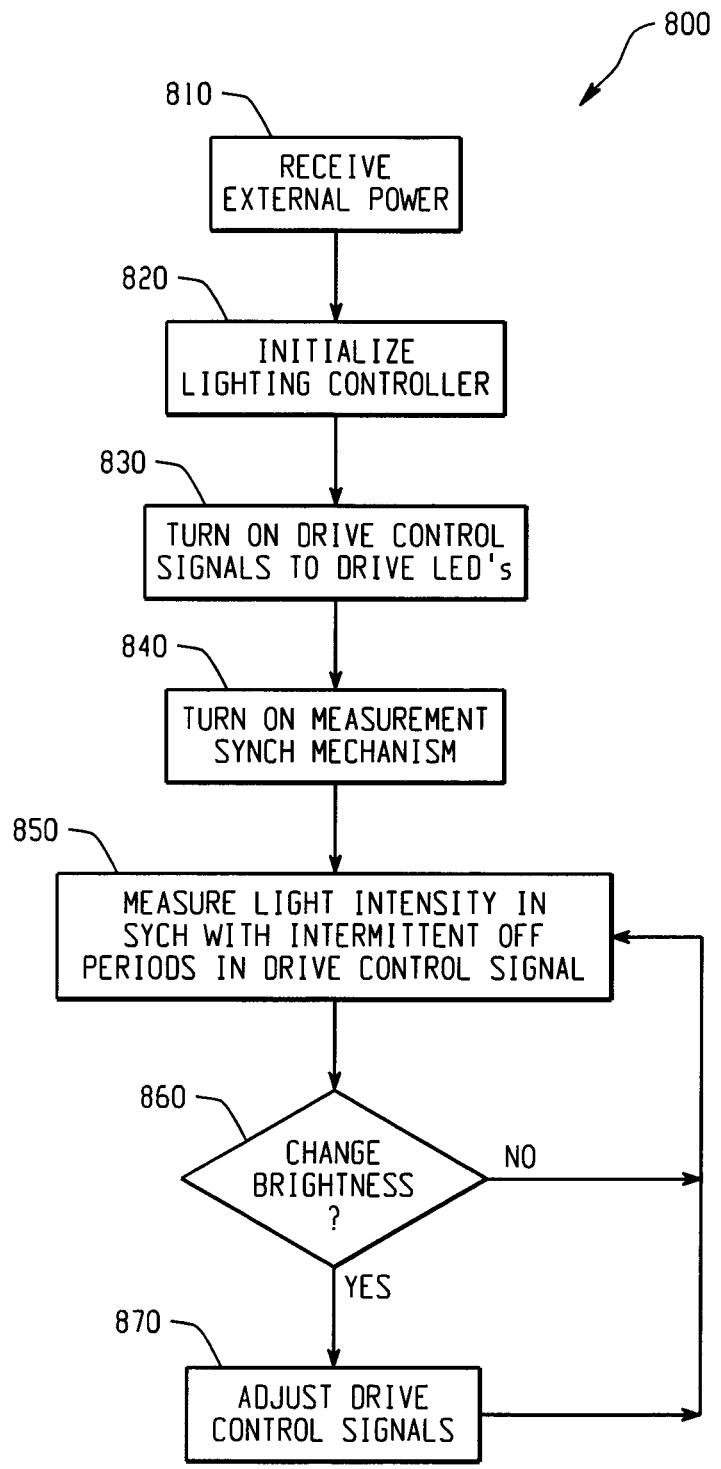
FIG. 8 is a schematic flow chart illustrating a method for operating a lighting system according to one embodiment.

FIG. 8 is a schematic flow chart illustrating a method for operating a lighting system according to one embodiment. The method 800 can be implemented by a lighting unit that includes LEDs to emit light, such as the lighting unit 200 that includes the LED driver 230 to drive the LED component 240 by power from the power circuit 210 to emit light as shown in FIG. 2. The lighting unit also includes control circuitry, such as the lighting controller 220 and the light sensor 250 to control the LED driver 230 and thus the light emitted by the LED component 230 in the lighting unit 200 (FIG. 2).

According to the method 800, the lighting unit receives external power (step 810). The external power can be received from a regular wall outlet, from a battery, a solar panel or any other power source, e.g., when a user turns on the lighting system. In the lighting unit 200 of FIG. 2, for example, the external power 205 is received by the power circuit 210 that is configured to convert the received external power to the different levels as required by the different parts of the lighting unit.

Next, the lighting unit initializes its lighting controller (step 820). In one implementation, the lighting controller includes a microcontroller having a central processing unit and memory, including non-volatile memory. The non-volatile memory can store programs (i.e., software instructions) to operate the lighting controller. In the lighting unit 200 of FIG. 2, for example, the microcontroller can initialize programs implementing the LED controller 222, the measuring component 224, and the synchronization component 226. For example, the microcontroller can load the programs into active memory, initialize their parameters, and initialize their connections.

After initialization, the lighting controller in the lighting unit turns on drive control signals to drive the LEDs (step 830). In the lighting unit 200 of FIG. 2, for example, the LED controller 222 can provide the drive control signals to the LED driver 230 that drives the LEDs in the LED component 240. In one implementation, the drive control signals include pulse width modulated (PWM) signals to turn the LEDs on and off alternately according to a predetermined frequency and duty ratio. The lighting controller can also turn on a current control signal to set the level of current flowing through the LEDs. In particular embodiments, the lighting controller can turn on the driver control signals so that the LEDs start operating at a predetermined level of illumination. For example, the lighting controller can turn on the LEDs at 50% to 80% level to give a quick response to the user who switched on the lighting unit, and to maintain the possibility for adjusting the lighting unit's brightness either up or down. Alternatively, the LEDs can be turned on at a maximum or a minimum brightness level. In one implementation, the drive control signals turn off the LEDs until later instructions.

The lighting controller in the lighting unit turns on a measurement synchronization mechanism (step 840). In the lighting unit 200 of FIG. 2, for example, the synchronization mechanism 226 can start generating measurement synch (strobe) signals that trigger measurements of the ambient light level. Or the synchronization mechanism can use the off periods of a PWM drive control signal to schedule ambient light level measurements.

The lighting controller in the lighting unit measures light intensity signals from an ambient light sensor in synch with intermittent off periods in the drive control signal (step 850). In the lighting unit 200 of FIG. 2, for example, the synchronization mechanism 226 generates measurement synch (strobe) signals that intermittently turn off (or substantially reduce) the LED power and trigger measurements (sampling) of the light intensity signal from the light sensor 250 during the intermittent off periods. Or the synchronization mechanism can use the off periods of a PWM drive control signal of the LEDs to schedule measurements (sampling) of the light intensity signal from the light sensor 250 during those off periods. Due to the synchronization of the intermittent off periods in the LED drive and the measurements (sampling) of the light intensity signal from the light sensor 250, the ambient light level can be more accurately measured.

The lighting controller in the lighting unit processes the measured light intensity signals to determine whether the brightness of the LEDs should be changed (decision 860). In the lighting unit 200 of FIG. 2, for example, the LED controller 222 can filter, e.g., average, the measured light intensity signals and use those processed measurements to determine whether the brightness should be changed. This processing can also correct systematic distortions, e.g., those caused by the light sensor, in the measured light intensity samples. The decision 860 can be based on reference settings that can be preset at the time of manufacture or set by users. The reference settings can define thresholds for turning on or off the lighting unit or to define appropriate adjustments to different ambient light levels. In one implementation, the lighting unit can include communication circuitry to receive the reference settings from a user even when the lighting unit is installed, thus the processing of the measured light intensity samples can be changed according to the user's instructions.

If the brightness of the LEDs should be changed (YES branch of decision 860), the lighting controller in the lighting unit adjusts the LED drive control signals (step 870). In the lighting unit 200 of FIG. 2, for example, the LED controller 222 can adjust the duty ratio of a PWM drive control signal. Alternatively or in addition, the LED drive control signals can be adjusted to modify the current through the LEDs. In one implementation, the lighting controller can use preprogrammed functions stored in a non-volatile memory of the lighting unit to determine the type and amount of the adjustment. For example, the lighting controller can be programmed to provide an inverse relationship between the measured ambient light level and a corresponding brightness of the LEDs. If the lighting unit includes communication circuitry to receive the reference settings from a user even when the lighting unit is installed, the brightness of the LEDs can be changed according to the user's instructions. Thus, the user can set (dim) the level of illumination.

After adjusting the LED drive signals (step 870) or if no change of the LED brightness is required (NO branch of decision 860), the lighting controller in the lighting unit returns to measuring light intensity signals from an ambient light sensor in synch with intermittent off periods in the drive control signal (step 850).

FIGS. 9A, 9B and 9C are schematic diagrams illustrating compact lighting units 910, 920, and 930, respectively, according to different embodiments. The compact lighting units 910, 920, and 930 provide physical arrangements to implement the lighting unit 130 (FIG. 1) or the lighting unit 200 (FIG. 2) that include light sensors to measure ambient light levels and are configured to adjust their brightness according to the measured ambient light levels. Thus, the lighting units 910, 920, and 930 can save energy without requiring complex and expensive external equipments.

As shown in FIG. 9A, the lighting unit 910 is implemented in a light bulb housing 912 having a BR series design with an Edison base 913 that can be attached to standard light fixtures to provide external power for the lighting unit 910. The lighting unit 910 includes a power circuit 914, a control circuit 916, an LED component 918 and a light sensor 919.

The power circuit 914 converts the external power into different DC powers as required for the operation of the LED component 918 as well as for the operation of the control circuit 916 and the light sensor 919. For example, the power circuit 914 can include switching power converters to convert an external AC power (between about 100V to about 250V at about 50-60 Hz) into a high DC power (between about 100V and about 300V) for the LED component 918 and into a low DC power (between about 2V and about 10V) for the control circuit 916 and the light sensor 919. The power circuit 914 can also include an LED driver to provide the high DC power for the LED component 918 in a controlled way, e.g., in intermittent periods. The power circuit 914 can be implemented in one or more integrated circuits installed in a printed circuit board that fits within the housing 912.

The control circuit 916 can be configured to control the LED component 918, e.g., through an LED driver implemented in the power circuit 914, based on ambient light measurements from the light sensor 919. The control circuit 916 can include a microcontroller or an application specific IC (ASIC) that can be installed on the same or a different printed circuit board than the power circuit.

In the lighting unit 910, the light sensor 919 is installed separate from the control circuit 916, in the proximity of the LED component 918 that is configured to emit light from the housing 912. In the example of FIG. 9A, the lighting unit 910 has no physical obstruction, such as a "wall" or "fence" that would block the light emitted by the LED component 918 to enter into the light sensor 919. Thus, the light sensor 919 may receive the emitted light directly or indirectly (through reflections) from the LED component 918. In fact, the light sensor 919 may receive such a high intensity light from the LED component 918 that, for practical purposes, no contribution can be detected from an external, ambient light due to the limited sensitivity of the light sensor 919. Thus, the control circuit 916 intermittently turns off the LED component 918 so that the light sensor 919 can more accurately sense the ambient light level in the absence of light from the LED component 918. Based on the measured ambient light intensity, the control circuit 916 can properly adjust the overall brightness of the lighting unit 910.

As shown in FIG. 9B, the lighting unit 920 is implemented in a light bulb housing 922 having a BR, R or PAR series design with an Edison base 923 that can be attached to standard light fixtures to provide external power for the lighting unit 920. The lighting unit 920 includes a power circuit 924, a control circuit 926, an LED component 928 and a light sensor 929 that are similar to the power circuit 914, the control circuit 916, the LED component 918 and the light sensor 919 of the lighting unit 910 discussed above with reference to FIG. 9A.

In the lighting unit 920, the light sensor 929 is installed on the same printed circuit board as the control circuit 926. In the example of FIG. 9B, the lighting unit 920 has a "light pipe" 925 that blocks the light emitted by the LED component 928 to enter into the light sensor 929. The light sensor 929, however, may receive the emitted light indirectly through reflections from the LED component 928. The illumination level of such reflections may substantially vary depending on the environment of the lighting unit 920. Due to these uncontrolled reflections, for practical purposes, the ambient light level cannot be detected in a reliable manner. Thus, the control circuit 926 intermittently turns off the LED component 928 so that the light sensor 929 can more accurately sense the ambient light level in the absence of light from the LED component 928. Based on the measured ambient light intensity, the control circuit 926 can properly adjust the overall brightness of the lighting unit 920.

As shown in FIG. 9C, the lighting unit 930 is implemented in a light bulb housing 932 having a tube style design. The lighting unit 930 includes a power circuit 934, a control circuit 936, an LED component 938 and a light sensor 939 that are similar to the power circuit 914, the control circuit 916, the LED component 918 and the light sensor 919 of the lighting unit 910 discussed above with reference to FIG. 9A.

In the lighting unit 930, the light sensor 939 is installed on an edge of the tube style housing 932 in a way that it is facing away from the main direction of the light emitted by the LED component 938. Due to this geometrical design, the light emitted by the LED component 938 does not directly enter into the light sensor 939. The light sensor 939, however, may receive the emitted light indirectly through reflections from the LED component 938. The illumination level of such reflections may substantially vary depending on the environment of the lighting unit 930. Due to these uncontrolled reflections, for practical purposes, the ambient light level cannot be detected in a reliable manner. Thus, the control circuit 936 intermittently turns off the LED component 938 so that the light sensor 939 can more accurately sense the ambient light level in the absence of light from the LED component 938. Based on the measured ambient light intensity, the control circuit 936 can properly adjust the overall brightness of the lighting unit 930.

This application uses examples to illustrate the invention. The patentable scope of the invention includes other examples.

What is claimed is:

1. A lighting unit, comprising:
   a LED component including one or more light emitting diodes (LEDs) configured to emit light from the lighting unit;
   a LED driver connected to the LED component configured to provide current to the one or more light emitting diodes;
   a light sensor configured to receive light from a surrounding of the light unit and to provide one or more light intensity signals based on the received light, wherein the light sensor is further configured to provide the one or more light intensity signals multiple times per second;
   a LED controller configured to provide a drive control signal to the LED driver, wherein the drive control signal includes intermittent periods during which the intensity of the light emitted by the LED component is lowered; and
   a measuring component configured to measure the one or more light intensity signals from the light sensor in synch with two or more of the intermittent periods in the drive control signal and to provide a measured light intensity to the LED controller.

2. The lighting unit of claim 1, wherein the LED component and the light sensor are components of a single light bulb.

3. The lighting unit of claim 1, wherein the LED controller is configured to adjust the drive control signal based on the measured light intensity and a user setting.

4. The lighting unit of claim 1, further comprising a housing configured to attach the lighting unit to a light fixture and to couple external power to the LED driver.

5. The lighting unit of claim 4, wherein the housing has a bulged reflector (BR) design on a parabolic aluminized reflector (PAR) design.

6. The lighting unit of claim 4, wherein the housing includes the light sensor and the LED component.

7. The lighting unit of claim 1, wherein the LED component includes LEDs emitting light with different colors, and wherein the LED component is configured to enable shifting a color of the light emitted by the LED component based on a signal from the LED driver.

8. The lighting unit of claim 7, wherein the LED component is configured to enable the shifting of the color by changing a wavelength of light emitted or by filtering light emitted.

9. The lighting unit of claim 1, wherein the light sensor includes a photopic sensor configured to provide a light intensity signal that approximates a response of the human eye.

10. The lighting unit of claim 1, wherein the light sensor includes a photodiode or a photoresistor.

11. The lighting unit of claim 1, wherein the LED component and the light sensor are positioned to limit an amount of light from the LED component that is directly received by the light sensor.

12. The lighting unit of claim 1, wherein the LED controller is configured to provide a pulse width modulated drive control signal to the LED driver to turn on and off the current to the one or more light emitting diodes in an alternating manner.

13. The lighting unit of claim 12, wherein the measuring component is configured to measure the one or more light intensity signals when the pulse width modulated drive control signal turns off the current to the one or more light emitting diodes.

14. The lighting unit of claim 13, wherein the LED controller is further configured to modify the pulse width modulated drive control signal to turn off the current to the one or more light emitting diodes when the light intensity measurements are performed.

15. The lighting unit of claim 12, further comprising a synchronization mechanism configured to generate a measurement synch signal to synchronize the pulse width modulated drive control signal with the light intensity measurements in the measuring component.

16. The lighting unit of claim 15, wherein the measurement synch signal includes a periodic signal.

17. The lighting unit of claim 15, wherein the measurement synch signal includes a pseudo-random signal.

18. The lighting unit of claim 1, further comprising an occupancy sensor configured to provide an occupancy signal to the measuring component, wherein the measuring component is further configured to provide occupancy measurements for the LED controller based on the occupancy signal.

19. The lighting unit of claim 1, further comprising a non-light environment sensor, wherein the lighting unit is configured to adjust a color of the light emitted by the LEDs based on a signal from the non-light environment sensor.

20. A method for operating a lighting unit including a light emitting diode (LED) component having one or more LEDs configured to emit light from the lighting unit and a light sensor configured to receive light from a surrounding of the lighting unit, the method comprising:

providing current to the one or more LEDs;

controlling the current to the one or more LEDs using a drive control signal that includes intermittent periods during which the intensity of the light emitted by the LED component is lowered, wherein the LED controller is configured to lower the intensity of the light emitted by the LED component multiple times per second;

providing one or more light intensity signals based on the light received by the light sensor multiple times a second; and performing measurements of the one or more light intensity signals from the light sensor in synch with two or more of the intermittent periods in the drive control signal.

21. The method of claim 20, further comprising using the measurements of the light intensity signal to adjust the drive control signal.

22. The method of claim 21, wherein using the measurements of the light intensity signal includes processing the measurements to determine whether the brightness of the LEDs should be changed.

23. The method of claim 20, wherein adjusting the drive control signal includes receiving a user setting and adjusting the drive control signal in accordance with the received user setting.

24. The method of claim 20, wherein the method further comprises:

providing an occupancy signal; and adjusting the drive control signal includes adjusting the drive control signal based on the occupancy signal.

25. The method of claim 20, wherein the method further comprises:

adjusting the drive control signal to shift a color of the light emitted by the LEDs.

26. The method of claim 20, wherein performing measurements of the light intensity signal from the light sensor in synch with the intermittent periods in the drive control signal includes generating a measurement synch signal and performing the measurements in accordance with the measurement synch signal.

27. The method of claim 26, wherein performing the measurements in accordance with the measurement synch signal includes modifying one or more intermittent periods in the drive control signal.

28. The method of claim 26, wherein the measurement synch signal includes a periodic signal.

29. The method of claim 26, wherein the measurement synch signal includes a pseudo-random signal.

* * * * *